US007479652B2

(12) United States Patent
Greentree et al.

(10) Patent No.: US 7,479,652 B2
(45) Date of Patent: Jan. 20, 2009

(54) QUBIT READOUT VIA CONTROLLED COHERENT TUNNELLING TO PROBE STATE

(75) Inventors: Andrew D. Greentree, Coburg (AU); Alexander Rudolf Hamilton, Forestville (AU); Frederick Green, Annandale (AU); Lloyd Christopher Leonard Hollenberg, Victoria (AU)

(73) Assignee: Qucor Pty. Ltd. (AU)

( * ) Notice: Subject to any disclaimer, the term of this patent is extended or adjusted under 35 U.S.C. 154(b) by 48 days.

(21) Appl. No.: 10/567,990

(22) PCT Filed: Aug. 10, 2004

(86) PCT No.: PCT/AU2004/001067

§ 371 (c)(1),
(2), (4) Date: Feb. 10, 2006

(87) PCT Pub. No.: WO2005/015489

PCT Pub. Date: Feb. 17, 2005

(65) Prior Publication Data

US 2006/0260016 A1  Nov. 16, 2006

(30) Foreign Application Priority Data

Aug. 11, 2003  (AU) ............................... 2003904256

(51) Int. Cl.
*H01L 29/06* (2006.01)
(52) U.S. Cl. .............................. 257/34; 257/9; 257/14; 257/30; 257/31; 257/E27.007
(58) Field of Classification Search .................. 257/14, 257/9, 30, 34, E27.007, 31
See application file for complete search history.

(56) References Cited

U.S. PATENT DOCUMENTS 5,323,344 A * 6/1994 Katayama et al. ........... 365/162

(Continued)

FOREIGN PATENT DOCUMENTS

WO   WO 2004/049252 A2   6/2004

OTHER PUBLICATIONS

Van Houten et al., "Coulomb-Blackade Oscillations in Semiconductor Manufacturing," from Grabert e al., "Single Charge Tunneling," NATO ASI Series B294 Plenum, New York, 1992—eprint at http://arxiv.org/abs/cond-mat/0508454.
Hollenberg et al., "Charge-Based Quantum Computing Using Single Donor Semiconductors"—Jun. 10, 2003—eprint at http://arxiv.org/abs/cond-mat/0306235.

(Continued)

*Primary Examiner*—Andy Huynh
(74) *Attorney, Agent, or Firm*—Wood, Phillips, Katz, Clark & Mortimer

(57) ABSTRACT

This invention concerns quantum computers in which the qubits are closed systems, in that the particle or particles are confined within the structure. A "site" can be produced by any method of confining an electron or other quantum particle, such as a dopant atom, a quantum dot, a cooper pair box, or any combination of these. In particular the invention concerns a closed three-site quantum particle system. The state in the third site is weakly coupled by coherent tunneling to the first and second states, so that the third state is able to map out the populations of the first and second states as its energy is scanned with respect to the first and second states. In second and third aspects it concerns a readout method for a closed three-state quantum particle system.

25 Claims, 14 Drawing Sheets

U.S. PATENT DOCUMENTS

| | | | |
|---|---|---|---|
| 5,663,571 | A | 9/1997 | Ugajin |
| 5,742,073 | A * | 4/1998 | Jiang et al. ................... 257/34 |
| 6,580,102 | B2 * | 6/2003 | Ivanov et al. ............... 257/200 |
| 6,605,822 | B1 * | 8/2003 | Blais et al. ................... 257/34 |
| 6,670,630 | B2 * | 12/2003 | Blais et al. ................... 257/33 |
| 6,784,451 | B2 * | 8/2004 | Amin et al. ................... 257/34 |
| 6,838,694 | B2 * | 1/2005 | Esteve et al. ................. 257/34 |
| 6,919,579 | B2 * | 7/2005 | Amin et al. ................... 257/31 |
| 6,943,368 | B2 * | 9/2005 | Amin et al. ................... 257/31 |
| 6,987,282 | B2 * | 1/2006 | Amin et al. ................... 257/34 |
| 7,332,738 | B2 * | 2/2008 | Blais et al. ................... 257/32 |
| 2002/0152191 | A1 * | 10/2002 | Hollenberg et al. ............ 707/1 |

OTHER PUBLICATIONS

A. D. Greentree et al. "Charge shelving and bias spectroscopy for the readout of a charge qubit on the basis of superposition states," Physical Review B, Jul. 16, 2004, vol. 70, article 041305—Whole document.

A. D. Greentree et al., "Electrical readout of a spin qubit without double occupancy" (online), Mar. 24, 2004 (retrieved on Oct. 8, 2004). Retrieved from the Internet ,<URL: http://xxx.lanl.gov/abs/cond-mat?04034449>- Whole document.

Patent Abstracts of Japan, JP 09-326485 A (SONY CORP) Dec. 16, 1997—Whole document.

International Search report for PCT/AU2004/001067.

* cited by examiner

QUBIT READOUT VIA CONTROLLED COHERENT TUNNELLING TO PROBE STATE

TECHNICAL FIELD

This invention concerns quantum computers in which the qubits are closed systems, in that the particle or particles are confined within the structure. In particular the invention concerns a closed three-site quantum particle system, in second and third aspects it concerns a readout method for a closed three-state quantum particle system.

BACKGROUND ART

The experimental observation, manipulation and utilization of coherent quantum mechanical properties in solid-state systems are key technological challenges for this century. The importance of incoherent quantum properties has been essential for the development of microelectronics and it is hoped that coherent quantum effects will spawn new technologies including, but not necessarily limited to, quantum computers [34].

There is at present limited experimental experience in coherent solid state systems without optical interactions, being mainly limited to superconducting systems of qubits [35,43,33] coupled 2 qubit systems [37,27] and 2D electron gas systems [47]. Although the successes of the superconducting work have been impressive, there is a strong impetus to develop coherent technologies that are compatible with the conventional semiconductor industry, due to the mature manufacturing technology and scalability advantages [28,32,24,9]. Although a truly coherent qubit is yet to be realized in a semiconductor system, incoherent precursors to qubits have already been fabricated, for example [41,8,6] and the rapid progress to date suggests that truly coherent effects will be observed soon.

An early suggested element for a quantum computer is the so-called 'charge qubit'. The charge qubit is where a charged particle, usually an electron or Cooper-Pair, can be in one of two distinct spatial positions. With electrical control and quantum coherence, such a two-state system can be used as a qubit. The concept of a charge qubit as a scalable system for performing quantum operations in a solid-state environment goes back to early work by Ekert et al [13,2,14] and Landauer [31]. The attractiveness of such schemes is the relative ease of control and readout, and the obvious progression of such concepts from the incoherent control of conventional computing architectures. Control can be performed using gate electrodes, and readout via sensitive electrometers, for example single-electron transistors, SETs, or quantum point contacts.

One important system that has been suggested for the realization of a charge qubit is the P-P$^+$ charge based quantum computer [24]. In this scheme, the qubit is defined by an electron localized to either the left or the right phosphorous ion, which constitutes two sites. This scheme has some interesting advantages over other, competing approaches, namely that readout is fairly easy to be achieved with single-electron transistors (SET) and gate operation time should be reasonably fast (~50 ps).

A major problem with the charge scheme is the relatively high decoherence associated with distributions of charge. In fact the coupling which so readily provides the readout, is also responsible for the rapid dephasing. One method for ameliorating this problem has been suggested, namely operation in the so-called superposition basis, and preliminary experiments in superconducting systems are suggestive of significant improvements in dephasing being attainable [43]. In the superposition basis, one operates near a degeneracy point, so that the qubit is not defined by the charge being on the one site or the other, but rather by the symmetric or anti-symmetric combination of sites. Operation at this point has a greatly reduced sensitivity to noise as the potential landscape is reasonably flat.

A further problem related to the decoherence is that population decay can occur in position space qubits on timescales which may be short compared to the measurement time needed for single shot readout with an electrometer, see for example Buehler et al. [7].

Another reason for pursuing measurements in the superposition basis derives from the need to perform state tomography [25] in order to characterize qubit performance. In state tomography the entire density matrix of the qubit (or more generally of the qubit system) after gate operation is mapped out. It requires access to non-orthogonal bases to work, and therefore access to both the position and superposition bases is necessary.

Until now, however, there has not been a natural method for performing readout of the superposition states and it is this problem which is the subject of this patent. For clarity, we will focus the following discussion of the invention to the P-P$^+$ paradigm for quantum computing, however it will be readily seen that the invention can be applied more generally.

SUMMARY OF THE INVENTION

In a first aspect, the invention is a closed three-site quantum particle system, comprising:

A first site in which the energy is controllable;

A second site in which the energy is controllable;

States in the first and second sites that are strongly coupled to each other by coherent tunnelling, and where the tunnelling rate is controllable;

A third site in which the energy is controllable, and where the state in the third site is weakly coupled by coherent tunnelling to the first and second states, so that the third state is able to map out the populations of the first and second states as its energy is scanned with respect to the first and second states.

A "site" could be produced by any method of confining an electron or other quantum particle, such as a dopant atom, a quantum dot, a cooper pair box, or any combination of these.

The first and second states of the system may be treated as a solid-state charge qubit with one particle, for instance an electron, shared between the two sites. This can be operated in the superposition basis with an integrated readout using the third site as a probe state. The superposition basis information, which is difficult to discriminate between using an electrometer in a two state system, is converted using the invention into charge distribution information, which is relatively easy to measure.

The mapping of the energy of the superposition basis constitutes a form of bias spectroscopy which is useful for characterizing physical parameters of a charge qubit.

To improve the readout mechanism a method akin to Adiabatic Fast Passage (AFP) may be employed. AFP is a form of charge shelving which allows close to 100% readout fidelity, for a review of adiabatic passage techniques, see, for example [44]. The necessary and sufficient requirements are a mapping of bases into different energy states which are resolvable within the linewidth limitations of the controlled tunnelling. This allows the particle to remain in the third state for a length of time much greater than the measurement time required for the electrometer, and therefore this concept is potentially important for all readout schemes of qubits.

The mapping requires two or more parameters to be modulated to force the system to remain on a specific adiabatic pathway, these parameters may be the difference between the probe energy and the qubit, and the tunnelling rate between the probe and the qubit. This method may be able to operate compatibly with re-initialisation by reversing the AFP trajectory so that the qubit is set into a known state.

The energies and tunnelling rates may be controlled using gate electrodes, in particular by controlling the voltages on the gate electrodes. A sensitive electrometer may be provided for reading out the population in the third state. The electrometer may be realised by a single electron transistor (SET) [15] which monitors the charge in the third (weakly coupled) site, or a quantum point contact.

Aside from the possibility of increased decoherence times, there are other advantages to superposition state readout. State tomography is necessary in order to properly characterize qubit operation. Tomography requires measurements in more than one basis, and therefore access to alternate bases is essential [25]. The invention is useful for combined superposition and position basis measurements.

These concepts are applicable to readout from a range of quantum computers. The quantum computer may use charge qubits, such as semiconductor donors, semiconductor quantum dots or superconducting Cooper pairs.

Alternatively, the system may involve a solid-state spin qubit on the first site, with a reference spin on the second site, and the third site may be used as a probe site. The relative spins of the first and second sites (qubit and reference) are impossible to discriminate using an electrometer, but they can be converted using the invention into charge distribution information, which is relatively easy to measure.

The mapping of the energy of the spin states constitutes a form of bias spectroscopy, which may be useful for characterizing physical parameters of the spin qubit and the two spin system.

To improve the readout mechanism a method akin to Adiabatic Fast Passage (AFP) may be employed. AFP is a form of charge shelving which allows close to 100% readout fidelity, for a review of adiabatic passage techniques, see, for example [44]. The necessary and sufficient requirements are a mapping of bases into different energy states which are resolvable within the linewidth limitations of the controlled tunnelling. The mapping requires two or more parameters to be modulated to force the system to remain on a specific adiabatic pathway, these parameters may be the difference between the probe energy and the qubit, and the tunnelling rate between the probe and the reference states.

This method may be able to operate compatibly with re-initialisation by reversing the AFP trajectory so that the qubit is set into a known state.

The energies and tunnelling rates may be controlled using gate electrodes, in particular by controlling the voltages on the gate electrodes. A sensitive electrometer may be provided for reading out the population in the third state. The electrometer may be realised by a single electron transistor (SET) [15] which monitors the charge in the third (weakly coupled) site, or a quantum point contact.

These concepts are applicable to readout from a range of quantum computers. The quantum computer may use spin qubits, such as nuclear spin or electron spin.

The invention may also be useful for other physical realizations of qubits, such as those involving flux quanta or 2D electron gas, in which a third state is introduced for readout.

In a second aspect, the invention is a readout method for a closed three-state quantum particle system, comprising the following steps:
Controlling the energy of a first site;
Controlling the energy of a second site;
Controlling the tunnelling rate between the first and second sites, which are strongly coupled to each other by coherent tunnelling;
Controlling the energy of a third site, the state in the third site being weakly coupled by coherent tunnelling to the first and second states, so the third state is able to map out the populations of the first and second states as its energy is scanned with respect to the first and second states.

To improve the readout mechanism a method akin to Adiabatic Fast Passage (AFP) may be employed. AFP is a form of charge shelving which allows close to 100% readout fidelity, for a review of adiabatic passage techniques, see, for example [44]. The necessary and sufficient requirements are a mapping of bases into different energy states which are resolvable within the linewidth limitations of the controlled tunnelling. This allows the particle to remain in the third state for a length of time much greater than the measurement time required for the electrometer, and therefore this concept is potentially important for all readout schemes of qubits.

The mapping requires two or more parameters to be modulated to force the system to remain on a specific adiabatic pathway, these parameters may be the difference between the probe energy and the qubit, and the tunnelling rate between the probe and the qubit or reference state. This method may be able to operate compatibly with re-initialisation by reversing the AFP trajectory so that the qubit is set into a known state.

The energies and tunnelling rates may be controlled using gate electrodes, in particular by controlling the voltages on the gate electrodes. A sensitive electrometer may be provided for reading out the population in the third state. The electrometer may be realised by a single electron transistor (SET) [15] which monitors the charge in the third (weakly coupled) site, or a quantum point contact.

In a third aspect the invention is a readout method for a closed three-state quantum particle system, comprising the following steps:
Mapping bases into different energy states which are resolvable within the linewidth limitations of controlled tunnelling to a probe state, where the mapping requires two or more parameters to be modulated to force the system to remain on a specific adiabatic pathway. The parameters may be the difference between the probe energy and the qubit, and the tunnelling rate between the probe and the qubit or reference state.

This method may be able to operate compatibly with re-initialisation by reversing the AFP trajectory so that the qubit is set into a known state.

The energies and tunnelling rates may be controlled using gate electrodes, in particular by controlling the voltages on the gate electrodes. A sensitive electrometer may be provided for reading out the population in the third state. The electrometer may be realised by a single electron transistor (SET) [15] which monitors the charge in the third (weakly coupled) site, or a quantum point contact.

BRIEF DESCRIPTION OF THE DRAWINGS

Examples of the invention will now be described with reference to the accompanying drawings, in which:

FIG. 1 (a) is a schematic diagram of a qubit, probe and readout gate.

FIG. 3 (b)-(g) are density plots showing the populations of $\rho_{ll}$ in (b) and (e), $\rho_{rr}$ in (c) and (f), and $\rho_{pp}$ in (d) and (g), as a function of time and $\Delta_{pl}$ (in units of $\Omega_{lr}$) for $E_l=E_r=0$, $\Omega_{rp}=\Omega_{lr}/20$ and $\Gamma=\Omega_{lr}/100$.

FIG. 7(b) is a graph of the energy eigenstates as a function of time for the AFP style population transfer.

FIG. 11 (b) is a schematic diagram of a more complex scheme where an extra gate is used to tune the coupling. FIG. 11 (c) is a schematic diagram for a more complex scheme where coupling is controlled via flux threaded through a Cooper-pair box.

FIG. 12 (b) is a triple well energy diagram.

FIG. 13 (b), (c) and (d) are transient bias spectroscopy readouts showing readout S as a function of time in units of $\pi\hbar/J_{lr}$ as a function of $E_p/J_{lr}$, with (b) showing any of the triplet states, (c) showing the singlet state, and (d) showing a superposition of the singlet and one of the triplet states.

FIG. 14(a) shows the AFP pulse. The left axis is $\Omega_{rp}/J_{lr}$, corresponding to the Gaussian variation in the rp tunnelling rate, the right axis is $E_p/J_{lr}$ corresponding to the linear ramp from high to low of the probe. FIG. 14(b) is a time varying eigenspectrum depicting evolution through the AFP sweep. Note that the form of the eigenspectrum is slightly modified from those shown earlier as $\Omega_{rp}$ is now varying as a function of time. FIG. 14(c) is a readout statistic for the triplet states (uppermost traces), superposition of singlet and triplet states (central traces) and singlet state.

BEST MODES OF THE INVENTION

Figures 1A, 1B:
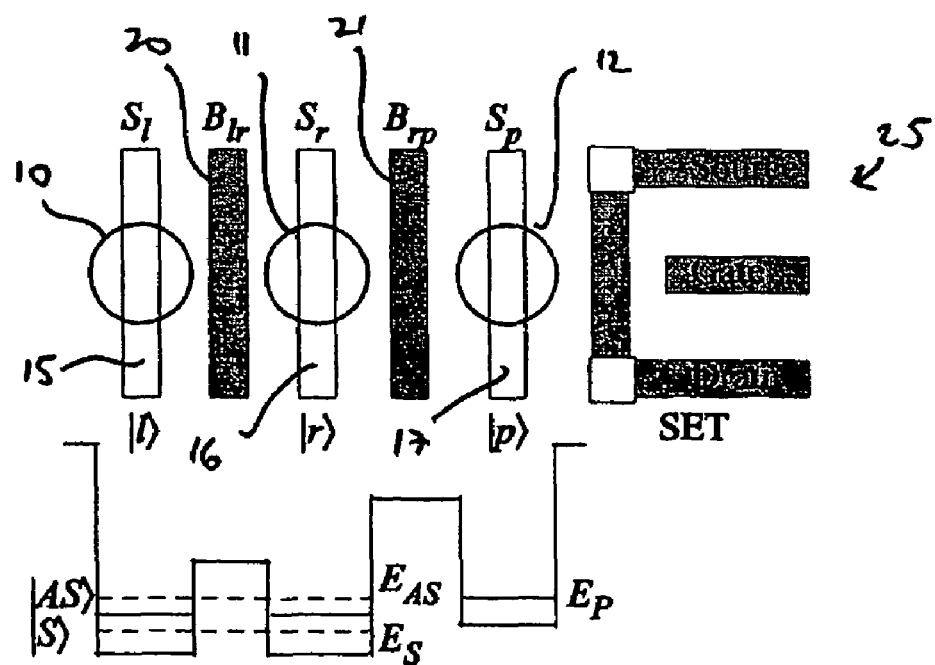
FIG. 1(b) is a triple well energy diagram for the qubit and probe.

Referring first to FIG. 1(a), a three-donor system comprises three ionized phosphorus donors 10, 11 and 12 sharing a single electron (not shown). The strongly coupled qubit is defined by the donors 10 and 11 labelled |l> and |r>. The weakly coupled probe 12 labelled |> provides the readout. We follow the gate notation used in Refs. [24].

The energies of each single-electron state are controlled using shift gates 15, 16 and 17, labelled $S_l$, $S_r$, $S_p$, and the energies of these states are $E_l$, $E_r$, $E_p$.

The coherent tunnelling rates, $\Omega_{lr}$ and $\Omega_{rp}$ are controlled by barrier gates 20 and 21 labelled $B_{lr}$ and $B_{rp}$ respectively, which control the barrier height (and hence the coherent tunnelling rates). There is assumed to be no tunnelling between 10 and 12. The B dependence is highlighted as a dynamically tunable variable, but the static properties dependent on fabrication processes have been dropped. This follows the spirit of Gurvitz's [19] treatment for the two coupled-dot system and accords with the work of Renzoni and Brandes [38] in a triple-well system.

An SET 25 reads out the electron on the probe donor 12.

The natural basis for the qubit will be the superposition basis, we write:

the symmetric state as $|S\rangle=(1/\sqrt{2})|r\rangle+|l\rangle)$ and the anti-symmetric state as $|AS\rangle=(1/\sqrt{2})|r\rangle-|l\rangle)$.

To readout, the energy on the probe 12, $E_p$, is varied using gate 17 and the population in 12 is monitored with the SET 25. There will be nonzero populations in 12 only when $E_p$ is degenerate with either of the superposition states $E_l$ or $E_r$ because these do not correspond to eigenstates of the strongly-coupled system. Similar bias spectroscopy is seen in 2DEG systems [47]. In optical Autler-Townes (AT) [1] experiments, it is usual to monitor the response of a weak probe field, which is proportional to the coherence $\rho_{rp}$, but in this case we are required to monitor the population $\rho_{pp}$. In FIG. 1(b) the triple well diagram shows a possible configuration where $E_l=E_r$ so that symmetric |S) and antisymmetric |AS) states are equally separated from $E_l=E_r$. $E_P$ has been tuned to $E_{AS}$ so that tunnelling from |AS) to |p) occurs.

In order to proceed, we will investigate the Hamiltonian to show the robustness of the superposition state to charge noise, and then numerically solve the density matrix equations of motion to show the transient and spectroscopic details. This is similar to the approach in Ref. [16]. We write down the interaction Hamiltonian (all energies expressed relative to $E_l$):

$$H=\Delta_{rl}|r\rangle\langle r|+\Delta_{pl}|p\rangle\langle p|-\hbar\Omega_{lr}(|l\rangle\langle r|+|r\rangle\langle l|)-\hbar\Omega_{rp}(|r\rangle\langle p|+|p\rangle\langle r|) \quad (1)$$

where $\Delta_{\alpha l}=E_\alpha-E_l$, $\alpha=r, p$. This Hamiltonian is identical to the well known three-level atom Hamiltonian in the rotating wave approximation from optics [40].

Eq. 1 may be more conveniently expressed in matrix form as:

$$H = \begin{bmatrix} 0 & \hbar\Omega_{lr} & 0 \\ \hbar\Omega_{lr} & \Delta_{rl} & \hbar\Omega_{rp} \\ 0 & \hbar\Omega_{rp} & \Delta_{pl} \end{bmatrix}.$$

Figure 2:
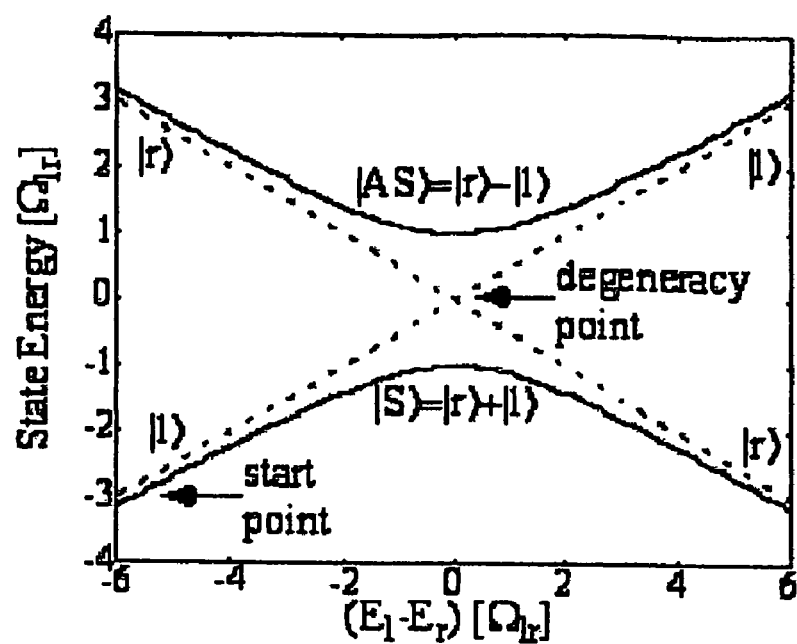
FIG. 2 is a state energy diagram for the qubit of FIG. 1.

FIG. 2 shows the energy levels of the $|l\rangle - |r\rangle$ qubit system as a function of $E_l - E_r$, which is a linear function of $S_r - S_l$, for a given $\Omega_{lr}$ (with all quantities normalized to $\Omega_{lr}$). Note that the eigenstates are presented unnormalized in the figure. The solid lines are the energy eigenstates, the dashed lines correspond to the non-interacting ($\Omega_{lr} = 0$) states. As the degeneracy point is approached, the eigenstates adiabatically evolve from the position states to the superposition states when coherent tunnelling is allowed by the barrier gates 20 and 21. The lower lying state at the degeneracy point is the symmetric state, and the higher, the anti-symmetric state.

"Adiabatic" is a word describing how evolution occurs. Adiabatic evolution is where a system is allowed to evolve so that it stays in the 'steady state' at all times—the system is always in equilibrium with the forces driving it. Usually, one applies slowly varying stimuli to achieve adiabatic evolution. Non-adiabatic (or sometimes diabatic) is the opposite of this, where a system is excited by a stimulus that can cause an abrupt change of state, and then the system responds causing 'ringing'.

The experiment directly analogous to the Nakamura experiment [35] in a charge qubit would be to initialize the system in state $|l\rangle$ (far left, start point) by setting $E_r \gg E_l$. We next shift the system nonadiabatically to the degeneracy point, $E_l = E_r$, allow coherent evolution, and then nonadiabatically return to the start point ($E_r \gg E_l$). As a function of the time spent at the degeneracy point, the final population in $|r\rangle$ will show characteristic oscillations, the signature of coherent evolution.

Noise can be viewed as a perturbation of the shift gates 15, 16 and 17. It is immediately clear from FIG. 2 that the system will be far more sensitive to gate noise well away from the degeneracy points. The rate of change of the energy level with gate voltage is minimized at the degeneracy point. We therefore would expect the system to be far more robust against decoherence mechanisms at the degeneracy point, than when well away from degeneracy, again, suggestive of the importance of superposition state operation and readout.

We now turn to the problem of solving the transient spectroscopy by investigating the density matrix equations of motion $$\dot{\rho} = -\frac{i}{\hbar}[H, \rho] + L$$

where $\rho$ is the density matrix, and L is an operator describing dephasing.

The $T_2$ processes are modelled by introducing a dephasing rate $\Gamma$ which is assumed to couple to all of the coherences, the $T_1$ processes are described by rates of incoherent population transfer [42]

$$\Gamma_{ab} = \chi_{\alpha\beta} \frac{\Delta_{\alpha\beta}}{1 - \exp(\Delta_{\alpha\beta}/kT)}$$

where k is Boltzmann's constant, T is the temperature and $\Omega_{\alpha\beta}$ is some rate related to the tunnelling probability between states $\alpha$ and $\beta$. $\Gamma_{\alpha\beta}$ is the rate of population transfer from $\beta$ to $\alpha$. Note that we have assumed no direct population transfer between states $|l\rangle$ and $|p\rangle$ by any means.

From here we may write down the density matrix equations of motion, which are:

$$\dot{\rho}_{ll} = i\Omega_{lr}(\rho_{rl} - \rho_{lr}) - \Gamma_{rl}\rho_{ll} + \Gamma_{lr}\rho_{rr}, \quad (2)$$

$$\dot{\rho}_{lr} = i\left[\frac{\Delta_{rl}}{\hbar}\rho_{lr} + \Omega_{lr}(\rho_{rr} - \rho_{ll}) - \Omega_{rp}\rho_{lp}\right] - \Gamma\rho_{lr},$$

$$\dot{\rho}_{lp} = i\left[\frac{\Delta_{pl}}{\hbar}\rho_{lp} + \Omega_{lr}\rho_{rp} - \Omega_{rp}\rho_{lr}\right] - \Gamma\rho_{lp},$$

$$\dot{\rho}_{rr} =$$

$$i[\Omega_{lr}(\rho_{lr} - \rho_{rl}) + \Omega_{rp}(\rho_{pr} - \rho_{rp})] + \Gamma_{rl}\rho_{ll} - (\Gamma_{lr} + \Gamma_{pr})\rho_{rr} + \Gamma_{rp}\rho_{pp},$$

$$\dot{\rho}_{rp} = i\left[\frac{\Delta_{pr}}{\hbar}\rho_{rp} + \Omega_{rp}(\rho_{pp} - \rho_{rr}) + \Omega_{lr}\rho_{lp}\right] - \Gamma\rho_{rp},$$

$$\dot{\rho}_{pp} = i\Omega_{rp}(\rho_{rp} - \rho_{pr}) + \Gamma_{pr}\rho_{rr} - \Gamma_{rp}\rho_{pp},$$

$$\rho_{\alpha\beta} = \rho_{\alpha\beta}^*,$$

$$1 = \rho_{ll} + \rho_{rr} + \rho_{pp}.$$

We solve Eqs. 2 by converting to a set of matrix equations.

$$X = (P + L)Y$$

where $$X = \begin{bmatrix} \dot{\rho}_{ll} \\ \dot{\rho}_{lr} \\ \dot{\rho}_{lp} \\ \dot{\rho}_{rl} \\ \dot{\rho}_{rr} \\ \dot{\rho}_{rp} \\ \dot{\rho}_{pl} \\ \dot{\rho}_{pr} \\ \dot{\rho}_{pp} \\ 1 \end{bmatrix}, \quad Y = \begin{bmatrix} \rho_{ll} \\ \rho_{lr} \\ \rho_{lp} \\ \rho_{rl} \\ \rho_{rr} \\ \rho_{rp} \\ \rho_{pl} \\ \rho_{pr} \\ \rho_{pp} \end{bmatrix}$$

and $$P = \begin{bmatrix} P_{11} & P_{12} & P_{13} \\ P_{21} & P_{22} & P_{23} \\ P_{31} & P_{32} & P_{33} \\ P_{41} & P_{42} & P_{43} \end{bmatrix}$$

$$P_{11} = i\begin{bmatrix} 0 & -\Omega_{lr} & 0 \\ -\Omega_{lr} & \Delta_{rl}/\hbar & -\Omega_{rp} \\ 0 & -\Omega_{rp} & \Delta_{pl}/\hbar \end{bmatrix},$$

-continued $$P_{22} = i \begin{bmatrix} -\Delta_{rl}/\hbar & -\Omega_{lr} & 0 \\ -\Omega_{lr} & 0 & -\Omega_{rp} \\ 0 & -\Omega_{rp} & \Delta_{pr}/\hbar \end{bmatrix},$$

$$P_{33} = i \begin{bmatrix} -\Delta_{pl}/\hbar & -\Omega_{lr} & 0 \\ -\Omega_{lr} & -\Delta_{pr}/\hbar & -\Omega_{rp} \\ 0 & -\Omega_{rp} & 0 \end{bmatrix},$$

and $P_{12}=P_{21}=i\Omega_{lr}I(3)$, $P_{23}=P_{32}=i\Omega_{rp}I(3)$, where $I(3)$ is the 3×3 identity matrix, $P_{13}=P_{31}=0$ and $P_{4,1}=[1,0,0]$, $P_{4,2}=[0,1,0]$, $P_{4,3}=[0,0,1]$. We also have $$L = - \begin{bmatrix} \Gamma_{rl} & 0 & 0 & 0 & -\Gamma_{lr} & 0 & 0 & 0 & 0 \\ 0 & \Gamma & 0 & 0 & 0 & 0 & 0 & 0 & 0 \\ 0 & 0 & \Gamma & 0 & 0 & 0 & 0 & 0 & 0 \\ 0 & 0 & 0 & \Gamma & 0 & 0 & 0 & 0 & 0 \\ -\Gamma_{rl} & 0 & 0 & 0 & \Gamma_{rl}+\Gamma_{pr} & 0 & 0 & 0 & -\Gamma_{rp} \\ 0 & 0 & 0 & 0 & 0 & \Gamma & 0 & 0 & 0 \\ 0 & 0 & 0 & 0 & 0 & 0 & \Gamma & 0 & 0 \\ 0 & 0 & 0 & 0 & 0 & 0 & 0 & \Gamma & 0 \\ 0 & 0 & 0 & 0 & -\Gamma_{pr} & 0 & 0 & 0 & \Gamma_{rp} \\ 0 & 0 & 0 & 0 & 0 & 0 & 0 & 0 & 0 \end{bmatrix}.$$

We study these equations using two approaches. Firstly we employ a spectroscopic approach to study $\rho_{pp}$ as a function of time and detuning, $\Delta_{pl}$. Secondly we map $\Delta_{pl}$ and $\Omega_{rp}$ along a specific trajectory to map population from one of the superposition states to state $|p\rangle$ using an Adiabatic Fast Passage (AFP)-like method.

Results and Discussion

In this section we present results obtained from the investigations of the density matrix equations of motion, Eqs. 2 looking at the transient response. These results will be shown to be analogous to similar optical cases, such as those presented in [16]. The two following sections deal with the time-dependent spectroscopy, i.e. for constant $\Delta_{pl}$, and the use of the third dot as a readout for a superposition based quantum computer, and therefore shows the result of performing AFP on the dot.

Time-Dependent Spectroscopy

Figure 3:
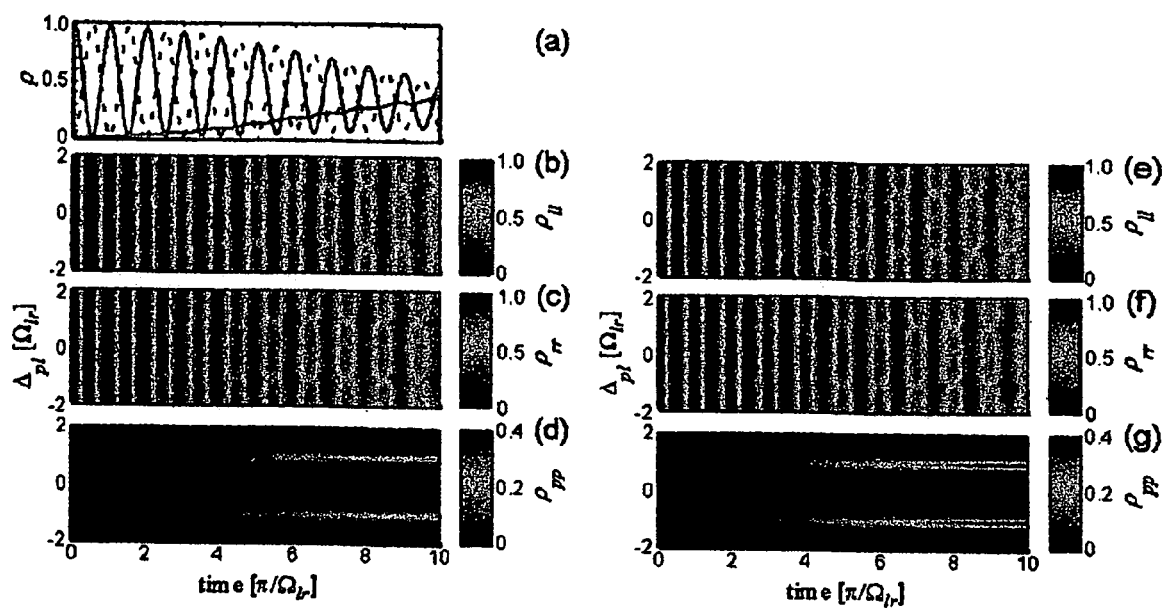
FIG. 3 (a) is a graph showing the variation of $\rho_{ll}$ (black solid line), $\rho_{rr}$ (black broken line) and $\rho_{pp}$ (grey solid line) as a function of time (in units of $\pi/\Omega_{lr}$) for $\Delta_{pl}/\Omega_{lr}=2$.

Almost all systems that undergo non-adiabatic evolution exhibit some kind of ringing, and the quantum computer systems are no exception. The periodic oscillations presented in FIG. 3 are population oscillations due to the system's having been artificially initialised in a state that is not an eigenstate of the system (and therefore not in the steady state). We have numerically integrated Eqs. 2 for various cases with $\rho_{ll}(0)=1$ so as to highlight all of the spectroscopic details. We also set $E_l=E_r=0$, $\Omega_{rp}=\Omega_{lr}/20$, $\Gamma=\Omega_{lr}/100$ and $\Omega_{\alpha\beta}=0$. In FIG. 3: (a)-(d) show populations for $\rho_{ll}(0)=1$, and (e)-(g) show populations for $\rho_{rr}(0)=1$. Notice the dominant oscillatory behavior in $\rho_{ll}(t)$ and $\rho_{rr}(t)$ and the AT doublet-like feature in $\rho_{pp}$. FIG. 3 (a) shows the time dependent populations when $E_P=E_{AS}$.

The dominant feature is the coherent population oscillations between l and r. There is also a steady buildup of population in p which is our measurement signal. In FIGS. 3 (b)-(d) we show $\rho_{ll}$, $\rho_{rr}$ and $\rho_{pp}$ respectively, as a function of time and $\Delta_{pr}$. Again, the dominant behavior is the coherent oscillation between l and r, however when $\Delta_{pr}=\pm\Omega_{lr}$, resonant tunnelling into p can occur, leading to the appearance of a doublet in $\rho_{pp}$ similar to the optical AT doublet. This population signal shows the bias spectroscopy allowing access to the superposition state dynamics. Analogous to FIGS. 3 (b)-(d), in FIGS. 3 (e)-(g) we show the dynamics when the system is initialized in state $|r\rangle$. The fact that both sets of dynamics show very similar results for $\rho_{pp}$ can be easily understood by realizing that our measurement basis is the superposition basis, and $|l\rangle$ and $|r\rangle$ can each be expressed as equal superpositions of symmetric and anti-symmetric states.

In order to prove that we are indeed able to discriminate between the symmetric and anti-symmetric basis, we begin our simulations in either of these two states and observe the results. To initialize in the symmetric state, we choose $\rho(0)=(½)[1;1;0;1;1;0;0;0;0]$, and to initialize in the anti-symmetric state we choose, $\rho(0)=(½)[1;-1;0;-1;1;0;0;0;0]$. The obtained pseudo-colour plots are presented in FIGS. 4 (a)-(c) (anti-symmetric state) and 4 (d)-(f) (symmetric state). The desired signals are clearly seen by the nonzero $\rho_{pp}$ at the energies corresponding to the energies of the symmetric and anti-symmetric states. This shows that this kind of triple-dot spectroscopy is (at least in the ideal case) able to discriminate between the superposition bases. The presence of a small signal at the energy corresponding to the undesired superposition state is due to dephasing effects which take population from one superposition state to the other.

The oscillatory behavior characteristic of FIG. 3 is no longer present as the initial states are eigenstates of the strongly coupled Hamiltonian. Large population signals in $\rho_{pp}$ are only observed when resonant with the appropriate state.

Figure 5:
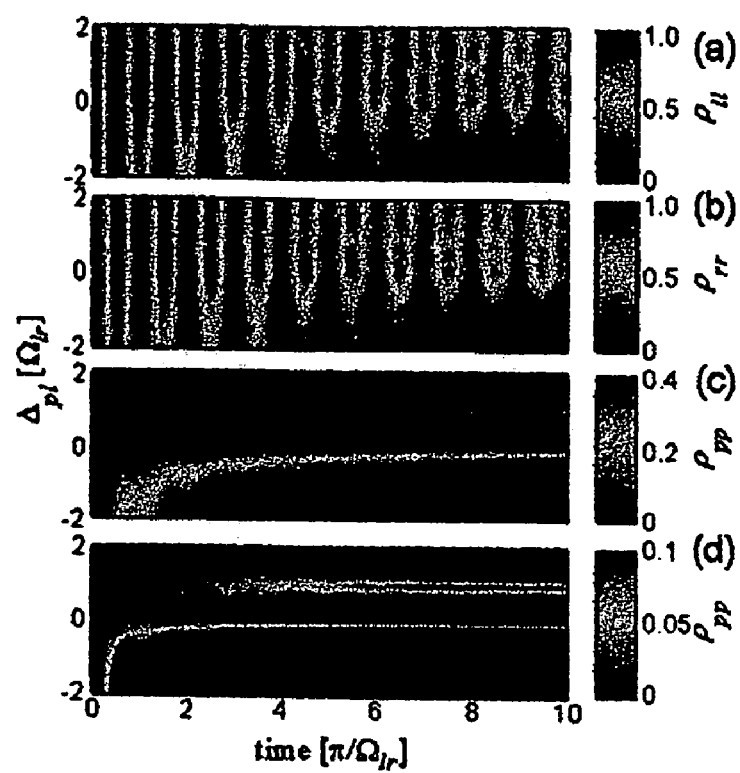
FIG. 5 (a)-(c) are density plots of populations as a function of time and $\Delta_{pl}$ with $\rho_{ll}(0)=11$ (initialized in |l>). $\rho_{ll}(t)$ in (a), $\rho_{rr}(t)$ in (b) and $\rho_{pp}(t)$ in (c) and (d), a smaller colour axis is used in (d).

Including nonzero $T_1$ processes complicates matters as is evinced by FIG. 5 which was generated using the above parameters, $E_l=E_r=0$, and $kT/(<\Omega_{lr})=0.002$, $\Omega_{lr}=\Omega_{rp}=0.1$. FIGS. 5 (a), (b) and (c) shows $\rho_{ll}$, $\rho_{rr}$ and $\rho_{pp}$ respectively. FIG. 5 (d) shows pop on a smaller colour axis to highlight the population transfer from the anti-symmetric state. Note that the dynamics for large negative $\Delta_{pl}$ are dominated by the incoherent relaxation processes pumping population into state $|p\rangle$. Such dynamics are clearly unsuitable for a quantum coherent readout. Just considering the space for $\Delta_{pl}>0$, however, shows that the behavior is qualitatively very similar to that found without $T_1$ processes.

The $T_1$ dephasing processes have little effect on the resonant $|l\rangle$-$|r\rangle$ system (qubit) except when $\Delta_{pl}$ is at modest negative values, indicating that the system will relax (incoherently) to this state. The fine scale used in (d), however, shows that a spectroscopic readout will still be possible in the presence of $T_1$ processes (albeit with reduced signal), provided we maintain $\Delta_{pl}$0.

Figure 4:
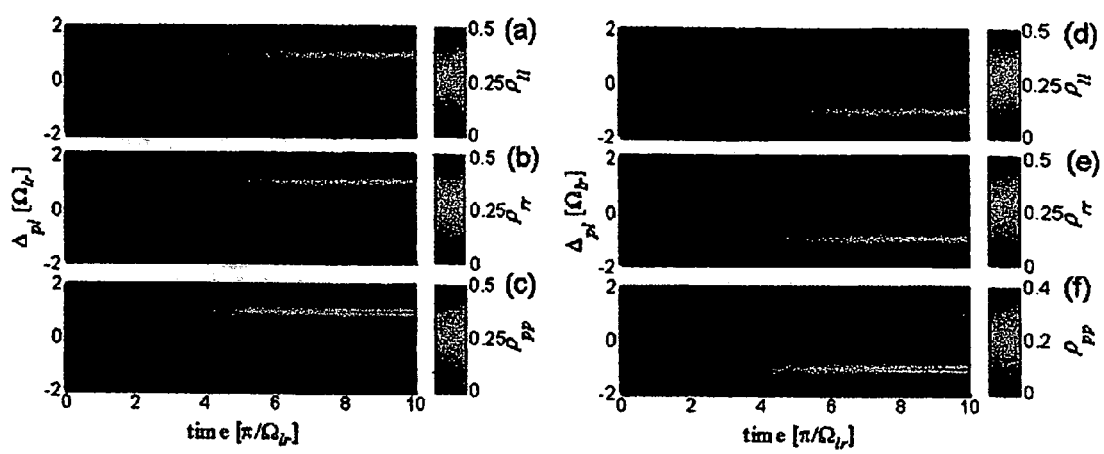
FIG. 4 (a)-(c) are density plots showing the populations with $\rho(0)=(\frac{1}{2})[1;-1;0;-1;1;0;0;0;0]$ (initialized in the anti-symmetric state), (d)-(f) are density plots showing the populations for $\rho(0)=(\frac{1}{2})[1;1;0;1;1;0;0;0;0]$ (initialized in the symmetric state). The density plots show the populations $\rho_{ll}$ in (b) and (e), $\rho_{rr}$ in (c) and (f), and $\rho_{pp}$ in (d) and (g), as a function of time and $\Delta_{pl}$ (in units of $\Omega_{lr}$) for $E_l=E_r=0$, $\Omega_{rp}=\Omega_{lr}/20$ and $\Gamma=\Omega_{lr}/100$.
Figure 6:
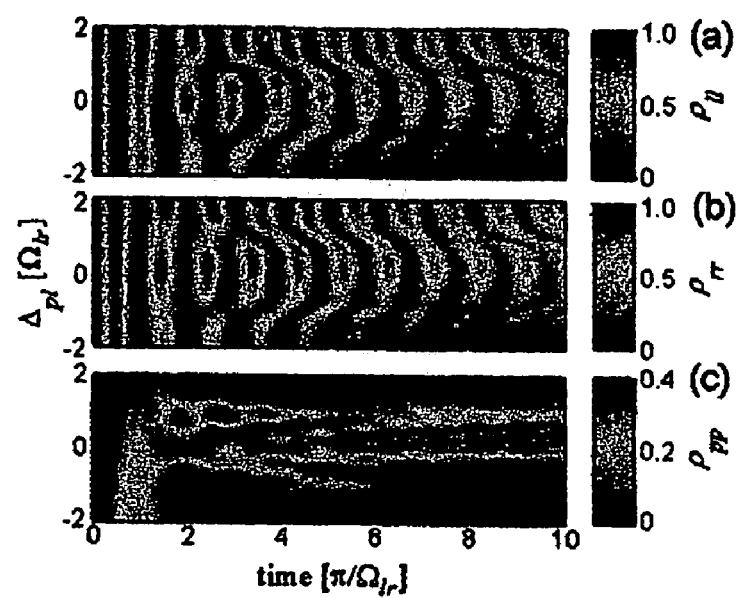
FIG. 6 (a)-(c) are density plots of populations as a function of time and $\Delta_{pl}$ with $\rho_{ll}(0)=1$ (initialized in |l>)). $\rho_{ll}(t)$ in (a), $\rho_{rr}(t)$ in (b) and $\rho_{pp}(t)$ in (c). The difference between these traces and those in FIG. 5 (a) to (c) is the enhanced $\Omega_{pr}=0.25\Omega_{lr}$.

The above plots in FIGS. 3 to 5 show the effect of a weak probe. However if the coupling to state $|p\rangle$ becomes significant, then the simple dynamics of a strongly coupled qubit probed via a weakly coupled dot become insufficient and true three-state dynamics need to be considered. To illustrate these three-state dynamics, we present in FIG. 6 a set of plots analogous to FIG. 5, but where $\Omega_{rp}/\Omega_{lr}$ has been increased from 0.05 to 0.25. The combined effects of $T_1$ and strong coupling have yielded a very complex system, which would appear to be undesirable for the operation of a quantum computer.

Readout Via Adiabatic Fast Passage (AFP)

Usually, one applies slowly varying stimuli to achieve adiabatic evolution, and indeed in most of the literature, adiabatic is taken to mean this; however it is not necessary. All that is required for adiabaticity is to maintain the steady state. In order to achieve adiabatic evolution on fast time-scales, one can employ adiabatic fast passage techniques, see Vitanov et al. [44] for a thorough review of these techniques in the optical/RF regimes. In these techniques a specific trajectory through phase space is taken by the system, according to controlled stimuli that force the system to stay on the specific adiabatic pathway.

In general, two or more parameters need to be modulated together to achieve adiabatic fast passage, in contrast to simple adiabatic evolution where only one external parameter needs to be varied. The advantages of adiabatic fast passage techniques include usually being highly robust to errors in the applied stimuli, compared with nonadiabatic pulses. They are relatively fast, typically requiring of order 10 coherent oscillation periods for transfer of population (compared with nonadiabatic transfer which is typically of order 1 oscillation period but susceptible to noise, and adiabatic evolution, which may require of order 100 oscillation periods). Adiabatic fast passage pulses require pulse shapes that are easily realized experimentally: typically exponential, or in our case cosinusoidal pulses which are attainable with most standard generators, contrasted with the square pulses required for non-adiabatic evolution which would need unfeasibly fast rise times in our experiments.

The trade-off is a slight increase in complexity because of the need to modulate more than one parameter simultaneously, although this should be relatively easily attained and indeed are required for full quantum computation in our system in any case.

Rather than restrict ourselves to setting the detuning, $\Delta_{pl}$ and reading the population which tunnels into state $|p\rangle$ as is done above, we can drive the population into state $|p\rangle$ (charge-shelving) from one of the superposition states by tunnelling control similar to AFP. The advantages of this are that $\rho_{pp}$ can be adiabatically driven to a large value (approaching unity) in a short time (typically a few $\Omega_{lr}^{-1}$) with high robustness against gate errors.

Because of the energy dependent $T_1$ decay processes, it is most useful to perform AFP between state $|p\rangle$ and the most energetic of the two superposition states, in this case the anti-symmetric combination. One needs to take some care in choosing the trajectory along which to modulate state $|p\rangle$ in this case, due to the fact that there will be off-resonant interactions. Our results are promising and suggest that optimization will be possible.

Figure 7:
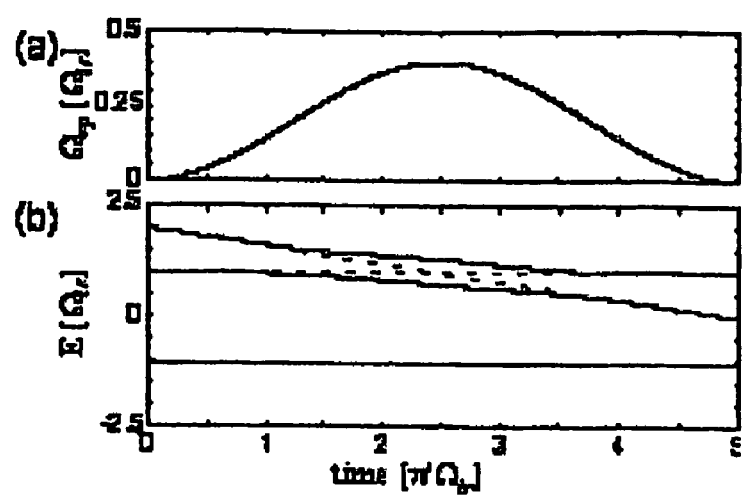
FIG. 7 (a) is a graph of $\Omega_{rp}$ as a function of time for the AFP style population transfer.

The energy of $|p\rangle$ is swept through resonance with the anti-symmetric superposition state, with the tunnelling rate $\Omega_{rp}$ pulsed. The trajectory taken by state $|p\rangle$ is governed by controlling both $\Delta_{pl}$ and $\Omega_{rp}$ and for the traces presented in FIG. 7 they were:

$$\Delta_{lp} = 2\Omega_{lr}(1 - t/t_{\max}) \quad (3)$$

$$\Omega_{rp} = \frac{\Omega_{rp}^{\max}}{2}[1 - \cos(2\pi t/t_{\max})],$$

where $\Omega_{rp}^{max}=0.4\Omega_{lr}$, $t_{min}=0$ and $t_{max}=5\pi/\Omega_{lr}$. In order to make this more explicit, FIG. 7 (a) shows $\cap_{rp}(t)$, note that in keeping with conventional AFP schemes, the scheme is fairly insensitive to the exact form of $\Omega_{rp}$; and (b) is a diagram showing the energy levels as a function of time for the trajectory used. Note that we have chosen a cosine dependence for $\Omega_{rp}$ rather than the more usual exponential dependence to ensure that $\Omega_{rp}=0$ at the beginning and end of the pulse.

The maximum tunnelling rate is when $E_p=E_{AS}$ ensuring adiabatic population transfer.

Figure 8:
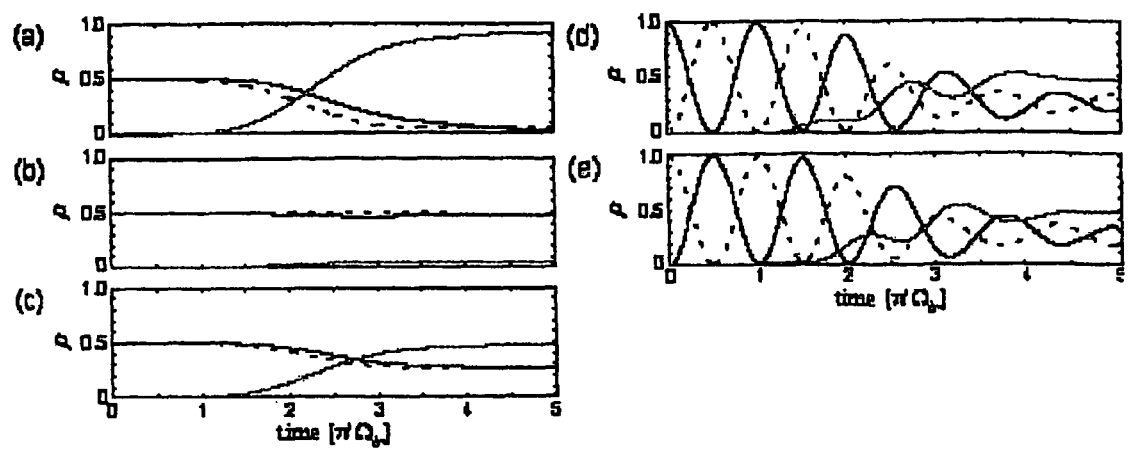
FIG. 8 (a) is a graph of populations as a function of time for the AFP trajectory in Eq. 3 for the anti-symmetric state, (b) is a graph for the symmetric state, (c) is a graph of a mixed state with equal initial populations in |l> and |r>, (d) is a graph of the results for the anti-symmetric state $\rho_{ll}(0)=1$ (|l>) and (e) is a graph of the results for the symmetric state $\rho_{rr}(0)=1$ (|r>). In each case the solid black line correspond to $\rho_{ll}(t)$, the dashed black line to $\rho_{rr}(t)$, and the solid gray line to $\rho_{pp}(t)$.

FIG. 8 (a) shows the populations for the qubit being initially prepared in $|AS\rangle$ with initial conditions $\rho(0)=(\frac{1}{2})[1;-1;0;-1;1;0;0;0;0]$. After AFP most of the population has been driven into $|p\rangle$. Similarly FIG. 8 (b) shows the effect of the AFP trajectory on $|S\rangle$ with initial conditions $\rho(0)=(\frac{1}{2})[1;1;0;1;1;0;0;0;0]$. Note that there is minimal population transfer. It is important to realize that the superposition states contain information about the coherence in the system, and so it is to be expected that there will be a different signature of incoherent states. In FIG. 8 (c) we show the results for a system initialized in a mixed state of $|l\rangle$ and $|r\rangle$ with initial conditions $\rho(0)=(\frac{1}{2})[1;0;0;0;1;0;0;0;0]$, and in FIGS. 8 (d) and (e) we show results for initialization in states $|l\rangle$ and $|r\rangle$ respectively. In each case the solid black line correspond to $\rho_{ll}(t)$, the dashed black line to $\rho_{rr}(t)$, and the solid gray line to $\rho_{pp}(t)$. In all cases, the measurement result at the end of the AFP trajectory is $\rho_{pp} \approx 0.5$. This result is hardly surprising, corresponding as it does to performing a projective measurement onto the superposition basis, and having equal probability of the system being in either the symmetric or anti-symmetric state. Note that the different initial conditions between the mixed states and states $|l\rangle$ and $|r\rangle$ suggest a tomographic scheme.

The readout fidelity of this method can be measured by comparing the final values of $\rho_{pp}$ for the different basis states, i.e.

$$F = \frac{\rho_{pp}^{AS}(t_{\max}) - \rho_{pp}^{S}(t_{\max})}{\rho_{pp}^{AS}(t_{\max}) + \rho_{pp}^{S}(t_{\max})}.$$

Figure 9:
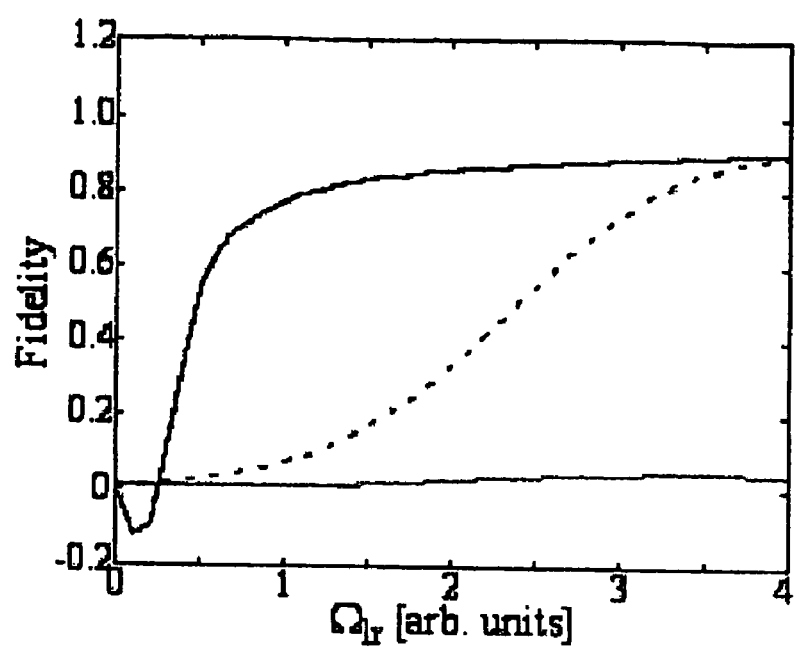
FIG. 9 is a graph showing the readout fidelity (solid black) and population transfer probabilities from the symmetric (solid gray) and anti-symmetric (dashed black) states as a function of $\Omega_{lr}$ for $\Omega_{rp}^{max}=0.8$.

We have calculated the readout fidelity as a function of $\Omega_{lr}$ for other parameters constant as above (although $T_1$ processes turned off) which is presented in FIG. 9. As expected, the readout fidelity is maximized when $\Omega_{lr} \gg \Omega_{rp}$. This is because off resonant interactions between the symmetric state and $|p\rangle$ are minimized. In the case considered, the maximum fidelity attained was around 90%. Although this number is far short of that required for scalable quantum computing, it is certainly possible to optimize this fidelity, which should enable arbitrarily high fidelities to be obtained.

Notice in FIG. 9 that there is a small region where the fidelity is negative, this is because, there is in fact stronger coupling to the undesired state than the desired state.

Note also that an important aspect of measurement of a qubit is the ability to re-initialize the qubit after measurement. The AFP scheme presented here is entirely reversible, and hence following readout it is straightforward to pump the electron back from the probe state into the anti-symmetric state with equally high fidelity as that obtained when performing the readout.

Other Systems

In this section we present some examples of methods of implementing similar schemes to the readout mechanism described above, more applicable to systems other than the P-P$^+$ charge-qubit. We first discuss tomographic style readout, followed by mechanisms for observing similar effects in superconducting experiments, and then applicability to spin-based qubits. As mentioned earlier, however, these are examples of what is essentially a highly general scheme, and experts in the field will be able to perceive the generality and applicability of the concepts.

Tomography

Figure 10:
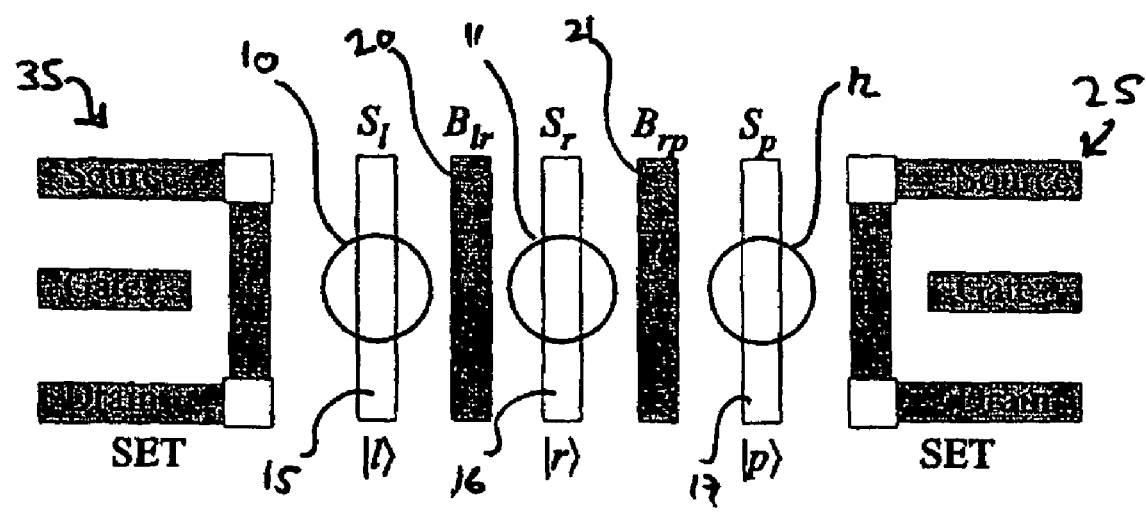
FIG. 10 is a schematic diagram for a proposed system for tomographic readout of the charge qubit.

Tomographic measurements, essential for proper characterization of quantum computational performance, require measurements in more than one basis [25]. The access to the superposition basis afforded by our measurement scheme is therefore extremely advantageous to the goal of tomography of the charge qubit. In FIG. 10 we show one scheme which is suggestive of a tomographic method, the arrangement is similar to FIG. 1 with the addition of a second SET 35 on the left side. The position basis can be monitored with the leftmost SET 35, and the superposition basis monitored with the rightmost SET 25 using AFP. Performing multiple measurements in alternate bases will enable full tomographic readout and density matrix reconstruction.

Reconstruction of the density matrix will require many measurements in the alternate bases. In Table 1 we show the results seen on each SET for an idealized experiment averaged over many experiments (where |MS⟩ is the mixed state, defined by the density matrix $\rho=(\frac{1}{2})[1;0;0;0;1;0;0;0;0]$). The measurements presented are with the AFP scheme, measurements in the position basis (AFP |l⟩⟨l|) and superposition basis (AFP |p⟩⟨p|), and without the AFP (No AFP |l⟩⟨l|). The fact that each of the five measured states give different measurement signatures demonstrates the feasibility of the tomographic scheme.

TABLE 1

Table showing measurement outcomes for the double SET system in FIG. 10. Measurements are to be performed both with and without AFP. If AFP performed, then both SETs are read out, otherwise only the leftmost SET is monitored.

| Initial State | AFP \|l⟩⟨l\| | AFP \|p⟩⟨p\| | No AFP \|l⟩⟨l\| |
|---|---|---|---|
| \|l⟩ | 0.25 | 0.5 | 1 |
| \|r⟩ | 0.25 | 0.5 | 0 |
| \|S⟩ | 0.5 | 0 | 0.5 |
| \|AS⟩ | 0 | 1 | 0.5 |
| \|MS⟩ | 0.25 | 0.5 | 0.25 |

Superconducting Systems

Superconducting systems are an obvious choice for systems which exhibit coherent quantum effects. There are several different flavours of superconducting qubits, and we will not discuss all of them, rather concentrating on one example. The generality of these concepts, however, should be obvious to one experienced in the art. The Cooper-pair box system is a particularly interesting system, and historically has been the earliest solid state system to exhibit the potential for scalable qubit operation (see for example Ref. [35]). The schemes presented in this work are certainly applicable to the Cooper-pair box system, and this system may therefore also benefit from the increased lifetimes associated with the superposition state.

Figure 11:
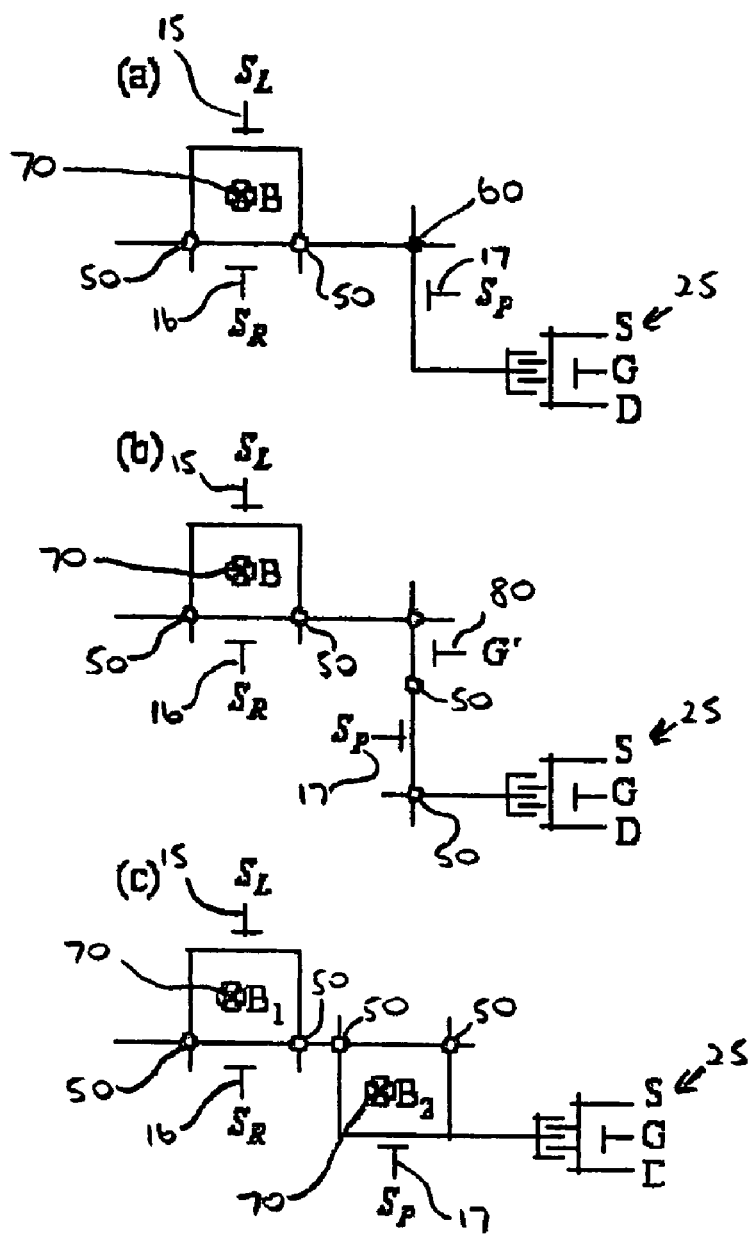
FIG. 11 (a) is a schematic diagram of a simple scheme for spectroscopic readout.

In FIG. 11 we present three suggestions for superconducting circuits which would be appropriate for the spectroscopic and AFP style measurements presented. These superconducting circuits are based on Cooper-pair boxes. The open circles 50 correspond to low resistivity tunnel junctions, the closed circle 60 to a high resistivity tunnel junction. 70 labelled B indicates a magnetic field threaded through the loop perpendicular to the page.

FIG. 11 (a) is a simple scheme which will only be capable of spectroscopic readout as the high resistivity tunnel junction 60 will not provide a tunable coupling.

FIG. 11 (b) and (c) illustrate alternative methods of performing the required AFP coupling schemes by tuning the coupling to the final area. Gate 80 labelled G' in (b) is an extra gate used to tune the coupling $\Omega_{rp}$ whereas in (c) the coupling $\psi_{rp}$ is controlled via the flux 70 threaded through the Cooper-pair box.

Note that these suggestions are by no means exhaustive, they are merely presented by way of example.

Spin Readout

Because of the interest in spin based qubits, there have been many proposals for methods to readout the state of a single spin. One example is the charge to spin conversion proposed by Kane [28]. That scheme (proposed for a phosphorus in silicon qubit) involves application of external gate biases to allow spin dependent tunnelling of an electron from one donor onto a second donor, creating a two electron state, the D⁻ state. This charge difference could then be measured using an SET. However, it is unclear if it will be possible to stabilize the D⁻ state for long enough to permit a successful readout. Another scheme for readout of electron spins comes from Loss and DiVincenzo [32] who propose two methods for spin readout in a quantum dot system, one by switchable tunnelling into a cooled paramagnetic dot, the magnetization of which is sensitive to the spin of the electron tunnelled, the other being the use of a 'spin valve' (see for example König and Martinek [30]. We are not aware of any single-shot spin measurements using a spin-valve, nor are we aware of experiments towards realizing the paramagnetic dot. Magnetic resonance force microscopy (MRFM) has been suggested as a readout mechanism, and the obtained sensitivities may well reach the single-spin level in the near future [10]. However we do not believe that such a method will constitute an effective and scalable readout mechanism for a spin based quantum computer. Optical readout has also been proposed (for example the resonant micro-Raman scheme of Koiler et al. [29]). Although certainly useful for bulk characterization, optical spot size limitations and optical collection efficiency will hamper effectiveness for single-shot quantum computing applications.

Figure 12:
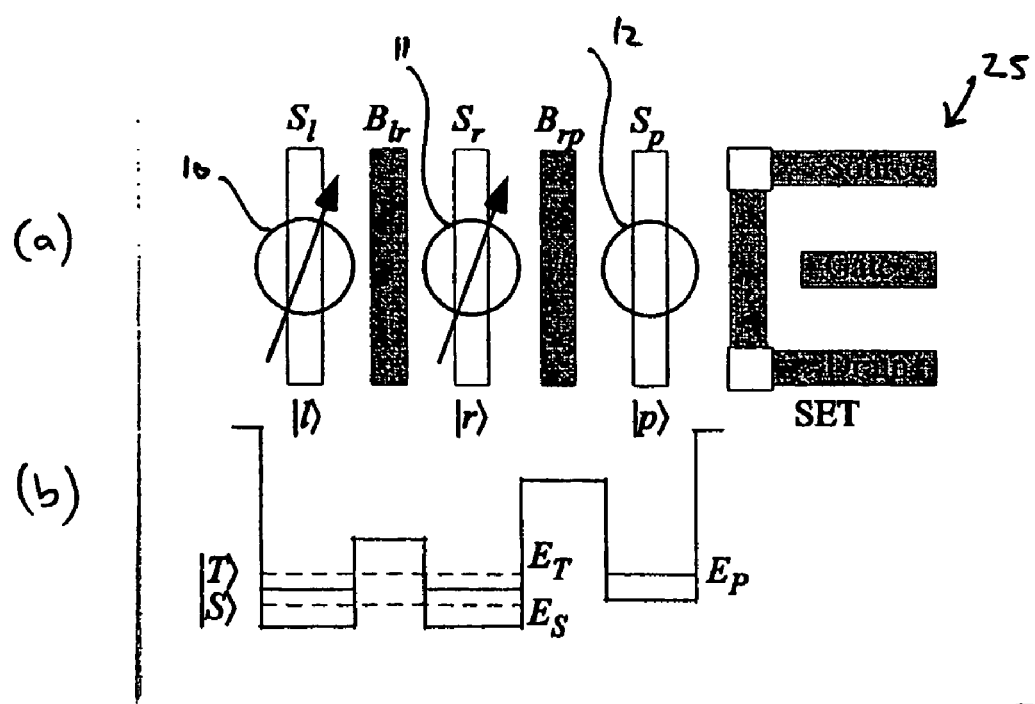
FIG. 12 (a) is a schematic diagram of an arrangement for superposition state readout which will be applicable to the readout of spin qubits.

We propose a modification of the superposition state readout which will be applicable to the readout of spin qubits similar to that depicted in FIG. 12 where there are three phosphorus donors 10, 11 and 12, the rightmost 12 being ionized and acting as the |p⟩ state. In the figure we have shown the case in the absence of a magnetic field, so that the triplet states are degenerate, however with a magnetic field applied, this degeneracy will be lifted.

If the separation of the states exceeds the effective transfer linewidth, then all of the different states will be resolvable using bias spectroscopic methods, however in order to use an AFP approach, it will be necessary to fine tune the parameters in order to achieve high fidelity readout. The spins of the phosphorus donors 10 and 11 (electron or nuclear spins) will couple via the exchange interaction and there will be an energy difference between the singlet and the triplet states. In particular the two spin system on donors l and r will couple via the exchange interaction to realize a singlet $|S\rangle = \frac{1}{2}(|\uparrow\downarrow\rangle - |\downarrow\uparrow\rangle)$ or triplet |T⟩ state. The exchange interaction lowers the energy of the singlet state relative to the triple, and so energy dependant tunnelling (bias spectroscopy) will be possible as before, with tunnelling from r to p occurring when $E_p=E_T$ or $E_p=E_S$ as appropriate, yielding a single shot spin readout, compatible with conventional RF-SETs. This all-electrical readout mechanism is therefore promising and highly applicable to the single-shot readout required for a quantum computer and is potentially superior to all other proposed spin readout mechanisms for this purpose.

We introduce here the full Hamiltonian in second quantization form for the two electron, three site problem (the form is different from the form used in Eq. (1)).

$$H = \sum_{\alpha=\downarrow}^{\uparrow}\left[\sum_i E_i b_{i,\alpha}^\dagger b_{i,\alpha} + \right.$$

$$\hbar\Omega_{lr}(b_{l,\alpha}^\dagger b_{r,\alpha} + b_{r,\alpha}^\dagger b_{l,\alpha}) + \hbar\Omega_{rp}(b_{r,\alpha}^\dagger b_{p,\alpha} + b_{p,\alpha}^\dagger b_{r,\alpha}) +$$

$$4\sum_{i,j} J_{ij}\left(b_{i\alpha}^\dagger b_{i\alpha} b_{j\bar\alpha}^\dagger b_{j\bar\alpha} - b_{i\alpha}^\dagger b_{i\bar\alpha} b_{j\bar\alpha}^\dagger b_{j\alpha} + \frac{1}{2} b_{i\alpha}^\dagger b_{i\alpha} b_{j\alpha}^\dagger b_{j\alpha}\right)\right] +$$

$$2\mu_B \sum_i B g * (b_{i\uparrow}^\dagger b_{i\uparrow} - b_{i\downarrow}^\dagger b_{i\downarrow})$$

where i and j are summed over all sites; a is summed over $\uparrow, \downarrow$ with $\bar\alpha = \downarrow, \uparrow$; $b_{i\alpha}$ is the annihilation operator for an electron on site i with spin $\alpha$; B is the magnet field; $E_i$ is the electrostatic energy of an electron on site $J_{ij}$ is the exchange energy between sites i,j with $J_{ii}=0$; and we define $B^*=2g^*\mu_B B$ as the Zeeman energy splitting.

The first point of attack for studying a Hamiltonian like Eq. (4) is to perform an eigenvalue analysis to identify the states and their migration through phase space. Anti-crossings between levels indicate interactions, and crossings indicate non-interacting levels.

Figure 13:
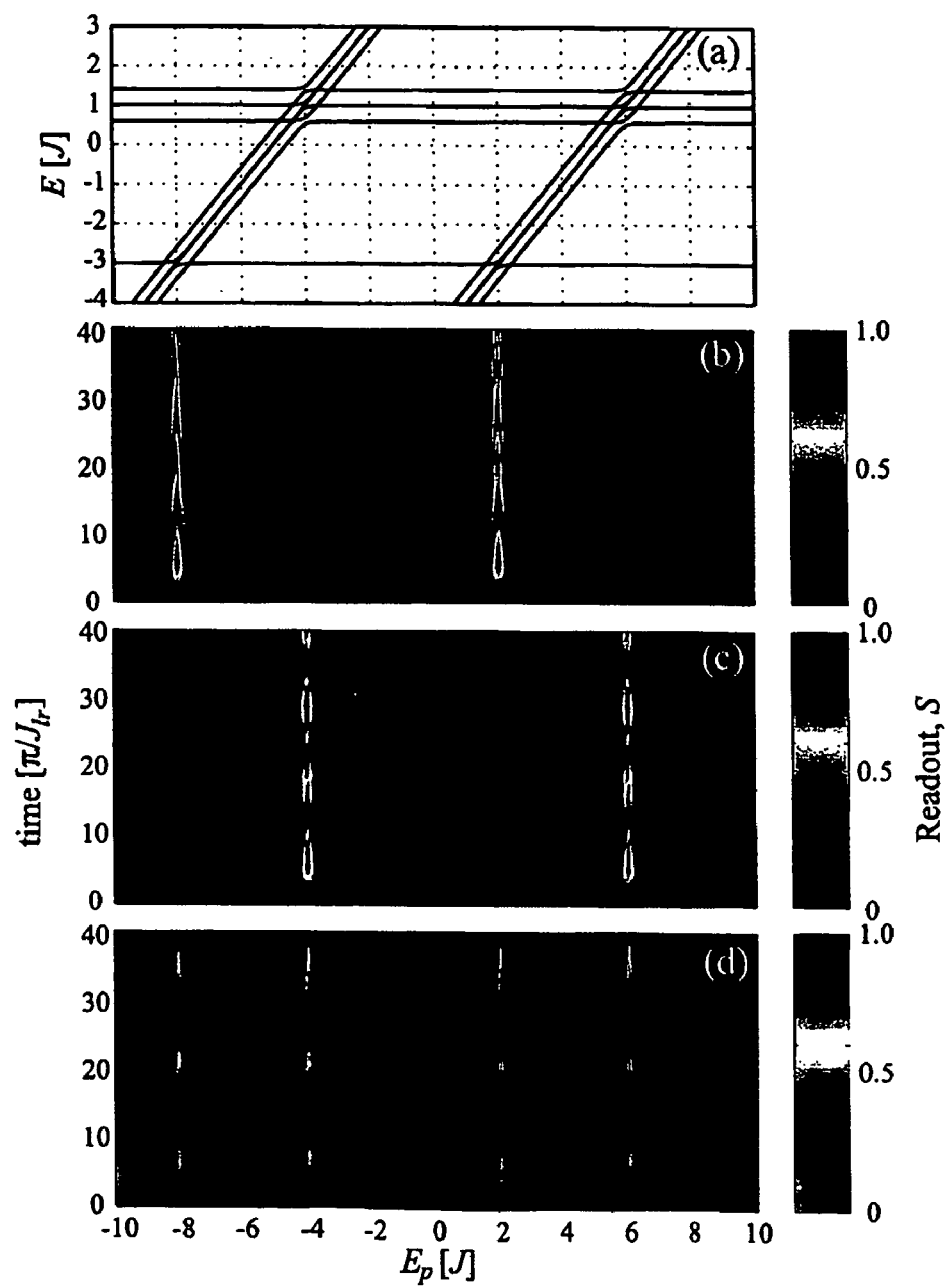
FIG. 13 (a) is a graph of the eigenvalues for a two-spin, three-well case as a function of the energy of the probe state, Ep.

FIG. 13 (a) is a graph of the eigenvalues for a two-spin, three-well case as a function of the energy of the probe state, Ep, for constant Zeeman splitting and exchange interaction.

Vertical lines correspond to eigenstates without any component of |p⟩ in them. The diagonal states have some |p⟩ and are split into two submanifolds, corresponding to symmetric (left) and anti-symmetric (right) combinations of |l⟩ and |r⟩.

Transients are obtained by solving the density matrix equations of motion. For simplicity we have not included dephasing processes, although these rates are expected to be compatible with those assumed in charge and spin based qubit schemes (note that we require only $\Omega_{rp}$ to be greater than the charge coherence time, and the system is only vulnerable to charge relaxation during this procedure, this requirement is unchanged from the initial proposal).

The density matrix equations of motion are $$\dot\rho = -\frac{i}{\hbar}[H, \rho]$$

which we solve numerically for various initial conditions. A realistic experiment to show these results would comprise (i) initialisation in a known state, (ii) evolution for length τ, (iii) measurement. The time axis in the following discussion is therefore indicative of the evolution as a function of the 'hold' time, τ.

FIG. 13 (b), (c) and (d) are transient bias spectroscopy readouts showing readout S as a a function of $E_p/J_{lr}$ and time (in units of $\pi\hbar/J_{lr}$ for $B^*/J_{lr},0=0.4$, $\Omega_{rp}/J_{lr}=0.1$, $E_l=E_r=0$ and various initial conditions, with (b) showing any of the triplet states, (c) showing the singlet state, and (d) showing a superposition of the singlet and one of the triplet states.

Figure 14:
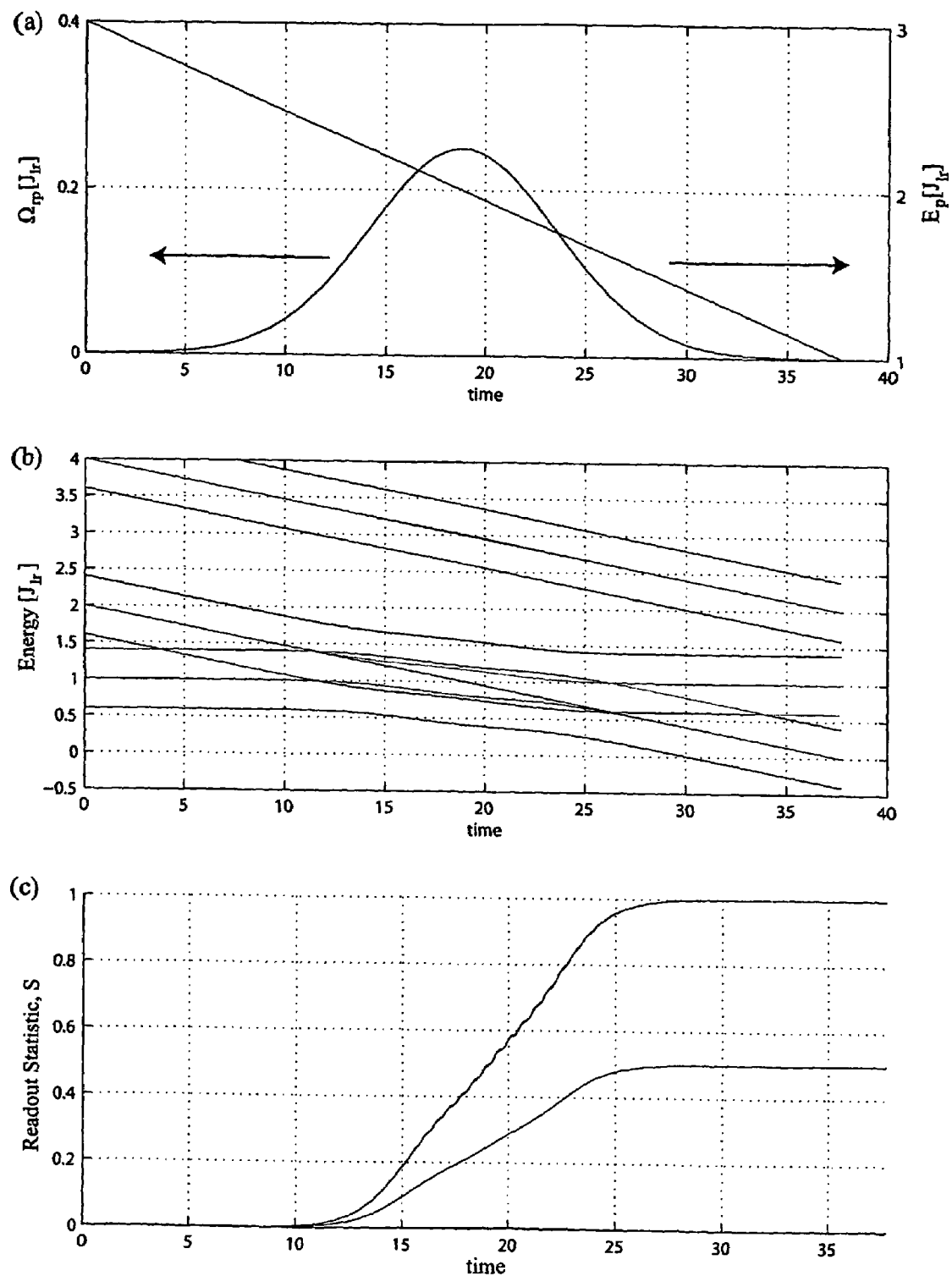
FIG. 14 is a series of graphs against time.

As with the need to operate with $Q_{lr} > J_{lr}$ (which is physically realistic) observed previously in the eigenvalue and transient analysis, so to with Adiabatic Fast Passage (AFP) we need to shift the overall working point along the $E_p$ axis, but there are no further modifications. The robustness and tolerance of the scheme is illustrated in FIG. 14, which shows AFP pulses, time varying eigenspectra and readout fidelity for $\Omega_{lr}=J_{lr}$. As $\Omega_{lr}/J_{lr}$ increases above unity, the fidelity of the transfer is found to improve.

The form of the AFP sweep has been discussed earlier, this time we choose:

$$E_p = 2(J_{lr} + \Omega_{lr})(1 - t/t_{\max}),$$

$$\Omega_{rp} = \Omega_{rp}^{\max} \exp\left(-\frac{(t - t_{\max}/2)^2}{2 * \sigma^2}\right)$$

where $\Omega_{rp}^{max}=0.25J, t_{min}=0, \sigma=t_{max}/8$ the standard deviation of the pulse, and $t_{max}=60\pi\hbar/J$. Note the only qualitative difference between this form and that presented earlier is the shift in the absolute position of $E_p$ (the change from cosinusoidal to exponential form is trivial).

Discussing first FIG. 14, the top trace (a) shows the pulsed rp coupling, $\Omega_{rp}/J_{lr}$ (left axis) and probe bias $E_p/J_{lr}$ (right axis) as functions of time. The corresponding time varying eigenspectrum is presented in the middle trace (b). The presence of the extra peaks at the top of the eigenspectrum is due to the other submanifold of states, however as can be seen they do not appear to interfere with the passage. The bottom trace (c) shows S as a function of time. As is expected with AFP-like schemes, population accumulates steadily in the desired state to extremely high fidelity. In keeping with the previous results, triplet readout goes to 1, and states in an equal superposition of singlet and triple asymptotically reach 0.5. The singlet state does not transfer population to the readout state, evinced by the observed S=0 across the singlet readout. The fact that there are still 'wiggles' in S suggest that some optimisation of the AFP scheme is still desirable.

After analysing the Digital Kane (DK) scheme [49], it has become clear that the spin readout scheme may be applicable to this scheme. The reasoning is that the triplet dot readout requires a three spatial eigenstates, which could be realised using donors to create the confining potential, or wells (for example in quantum dot structures). Our scheme could be comprised of a hybrid architecture, namely of donors and wells, for example where the lr system is a two-donor system, and p is a quantum dot. Such an implementation would naturally arise in DK where qubits are defined by nuclear and electronic spins, and there are shuttling sites which are effective quantum dots at the Si/SiO$_2$ interface. It may therefore be possible to use this technique as a readout scheme for this alternative computing architecture.

As stated before, the ideas presented in this work are higlly general and should be applicable to any system where energy resolved states exist. We have concentrated our discussions on systems where the energy separation arises due to symmetric and anti-symmetric combinations of charge-position states, or to Cooper-Pair occupancies.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

REFERENCES

[1] S. H. Autler and C. H. Townes, Phys. Rev. 100 703 (1955).
[2] A. Barenco, D. Deutsch, A. Ekert, and R. Josza, Phys. Rev. Lett. 74, 4083 (1995).

[3] S. D. Barrett and G. J. Milbur, eprint arXiv: cond-mat/0302238.

[4] T. Brandes, F. Renzoni, and R. H. Blick, Phys. Rev. B, 64, 035319 (2001).

[5] T. Brandes, and T. Vorrath, Phys. Rev. B 66, 075341 (2002).

[6] R. Brenner, A. R. Hamilton, R. G. Clark, and A. S. Dzurak, Microelectron. Eng. 67-68C, 826 (2003).

[7] T. M. Buehler, D. J. Reilly, A. D. Greentree, A. R. Hamilton, A. S. Dzurak, and R. G. Clark, submitted for publication and eprint arXiv: condmat10304384 (2003).

[8] T. M. Buehler, D. J. Reilly, R. Brenner, A. R. Hamilton, A. S. Dzurak, and R. G. Clark, Appl. Phys. Lett. 82, 577 (2003).

[9] P G. Clark et al. Philos. Trans. R. Soc. London, Ser. A 361, 1451 (2003).

[10] R. G. Clark, P. C. Hammel, A. Dzurak, A. Hamilton, L. Hollenberg, D. Jamieson, and C. Pakes, Los Alamos Science, 27, 284 (2002).

[11] M. Crogan, S. Khlebnikov, and G. Sadiek, Supercond. Sci. Technol. 15, 8 (2002).

[12] S. R. de Echaniz, A. D. Greentree, A. V. Durrant, D. M. Segal, J. P. Marangos, and J. A. Vaccaro, Phys. Rev. A 64, 013812 (2001).

[13] A. Ekert, *Quantum cryptography and computation*, in Advances in Quantum Phenomena (Plenum Press, New York, 1995), pp 243-262.

[14] A. Ekert and R. Josza, Rev. Mod. Phys. 68, 733 (1996).

[15] H. Grabert, and M. H. Devoret, NATO Adv. Study Inst. Ser., Ser. B 294 (1992).

[16] A. D. Greentree, T.B. Smith, S. R. de Echaniz, A. V. Durrant, J. P. Marangos, D. M. Segal and J. A. Vaccaro, Phys. Rev. A, 65, 053802 (2002).

[17] A. D. Greentree, C. Wei, S. A. Holnstrom, J. P. D. Martin, N. B. Manson, K. R. Catchpole and C. Savage, J. Opt. B: Quantum Semiclass. Opt. 1, 240 (1999).

[18] A. D. Greentree, C. Wei, and N. B. Manson, Phys. Rev. A 59, 4083 (1999).

[19] S. A. Gurvitz, Phys. Rev. B 56, 15 215 (1997).

[20] S. A. Gurvitz, Phys. Rev. B 57 6 602 (1998).

[21] B. L. Hazelzet, M. R. Wegewijs, T. H. Stoof, and Yu. V. Nazarov, Phys. Rev. B 63, 165313 (2001).

[22] U. Hohenester, F. Troiani, E. Molinari, G. Panzarini and C. Macchiavello, Appl. Phys. Lett. 77, 1864(2000).

[23] A. W. Holleitner, R. H. Blick, A. K Huttel, K. Eberl, and J. P. Kotthaus, Science 297, 5578 (2002).

[24] L. C. L. Hollenberg, A. S. Dzurak, C. Wellard, A. R Hamilton, D. J. Reilly, G. J. Milburn, and R. G. Clark, *Charge-based quantum computing using single donors in semiconductors* eprint arXiv cond-mat/0306235 (submitted).

[25] D. F. V. James, P. G. Kwiat, W. J. Munro, and A. G. White, Phys. Rev. A 64, 052312 (2001).

[26] Z. T. Jiang, J. Peng, J. Q. You, and H. Z. Zheng, Phys. Rev. B 65, 153308 (2002).

[27] P. R. Johnson, F. W. Strauch, A. J. Dragt, R. C. Ramos, C. J. Lobb, J. R. Anderson, and F. C. Wellstood, Phys. Rev. B 67, 020509 (2003).

[28] B. E. Kane, Nature 393, 133 (1998); B. E. Kane, N. S. McAlpine, A. S. Dzurak, R. G. Clark, G. J. Milburn, H. B. Sun, and H. Wiseman, Phys. Rev. B 61, 2961 (2000); see also WO 99/14614.

[29] B. Koiler, X. Hu, H. D. Drew, and S. Das Sarma, Phys. Rev. Lett, 90, 067401(2003).

[30] J. König and J. Martinek, Phys. Rev. Lett. 90, 166602 (2003).

[31] R. Landauer, Science 272, 1914 (1996).

[32] D. Loss and D. DiVincenzo, Phys. Rev. A, 57, 120 (1998).

[33] J. M. Martinis, S. Nam, J. Aumentado, and C. Urbina, Phys. Rev. Lett. 89, 117901 (2002).

[34] M. A. Nielsen and I. L. Chuang, *Quantum Computation and Quantum Information* (Cambridge University Press, Cambridge, England 2000).

[35] Y. Nakamura, Yu. A. Pashkin, and J. S. Tsai, Nature 398, 786 (1999).

[36] T. H. Oosterkamp, S. F. Godijn, M. J. Uilenreef, Y. V. Nazarov, N. C. van der Vaart, and L. P. Kouwenhoven, Phys. Rev. Lett. 80, 4951 (1998).

[37] Y. A. Pashlkin, T. Yamamoto, O. Astafiev, Y. Nakamura, D. V. Averin, and J. S. Tsai, Nature 421 823 (2002).

[38] F. Renzoni and T. Brandes, Phys. Rev. B 64, 245301 (2001).

[39] P. Silvestrini, and L. Stodolsky, Phys. Lett. A 280, 17 (2001).

[40] B. W. Shore, The theory of coherent atomic excitation (John Wiley and Sons, New York, 1990).

[41] G. L. Snider, A. O. Orlov, I. Amlani, X. Zhou, G. H. Bernstein, C. S. Lent, J. L. Merz, and W. Porod, J. Appl. Phys. 85, 4283 (1999).

[42] G. Tóth, A. O. Orlov, L. Amlani, C. S. Lent, 0. H. Bernstein, and G. L. Snider, Phys. Rev. B 60, 16906 (1999).

[43] D. Vion, A. Aassime, A. Cottet, P. Joyez, H. Pothier, C. Urbina, D. Esteve, and M. H. Devoret, Science 296, 886 (2002).

[44] N. V. Vitanov, T. Halfmann, B. W. Shore, and K. Bergmann, *Laser-induced population transfer by adiabatic passage techniques*, Annu. Rev. Phys. Chem. 52, 763 (2001).

[45] F. R. Waugh, M. J. Berry, D. J. Mar, R. M. Westervelt, K. L. Chapman, and A. C. Gossard, Phys. Rev. Lett. 75, 705 (1995).

[46] Y. Wei, J. Wang, and H. Guo, Phys. Rev. B 62, 9947 (2000).

[47] W. G. van der Wiel, S. De Franceschi, J. M. Elzerman, T. Fujisawa, S. Tarucha, L. P. Kouwenhoven, Rev. Mod. Phys. 75, 1 (2003).

[48] W. G. van der Wiel, T. Fujisawa, S. Tarucha, and L. P. Kouwenhoven, Jpn. J. Appl. Phys. 40, 2100 (2001).

[49] A. Skinner, M. Davenport, and B. Kane, Phys. Rev. Lett. 90, 087901 (2003).

The invention claimed is:

1. A closed three-site quantum particle system, comprising: a first site in which energy is controllable; a second site in which energy is controllable; states in the first and second sites that are strongly coupled to each other by coherent tunnelling, and where a tunelling rate is controllable; and, a third site in which energy is controllable, the third site having a state that is weakly coupled by coherent tunnelling to the states in the first and second sites, so that the third state is able to map out populations of the first and second states as its energy is scanned with respect to the first and second states.

2. The closed three-site quantum particle system according to claim 1, wherein the states in the first and second sites are a solid-state charge qubit with one particle shared between the first and second sites.

3. The closed three-site quantum particle system according to claim 2, wherein the system is operated in the superposition basis with an integrated readout using the state of the third site as a probe state.

4. The closed three-site quantum particle system according to claim 3, wherein Adiabatic Fast Passage (AFP) is employed as a readout mechanism, and during readout the AFP has trajectory.

5. The closed three-site quantum particle system according to claim 4, wherein difference between the energy of the probe state and the energy of the qubit, and the tunnelling rate between the probe state and the qubit are modulated to effect AFP.

6. The closed three-site quantum particle system according to claim 4, wherein the AFP trajectory is reversed to re-initialise the qubit into a known state.

7. The closed three-site quantum particle system according to claim 1, wherein the energies and tunnelling rates are controlled using gate electrodes.

8. The closed three-site quantum particle system according to claim 7, wherein voltages on the gate electrodes are controlled.

9. The closed three-site quantum particle system according to claim 7, wherein a sensitive electrometer is used for reading out the population in the third state.

10. The closed three-site quantum particle system according to claim 9, wherein the sensitive electrometer is realised by a single electron transistor (SET) which monitors charge in the third, weakly coupled, site.

11. The closed three-site quantum particle system according to claim 10, wherein the sensitive electrometer is realised by a quantum point contact.

12. The closed three-site quantum particle system according to claim 1, when used for readout from a quantum computer.

13. The closed three-site quantum particle system according to claim 1, wherein alternatively, the first site involves a solid-state spin qubit, and the second site involves a reference spin and the state of the third site is used as a probe state.

14. The closed three-site quantum particle system according to claim 13, wherein relative spins of the first and second sites are converted into charge distribution information.

15. The closed three-site quantum particle system according to claim 13 or 14, wherein Adiabatic Fast Passage (AFP) is employed as a readout mechanisms, and during readout the AFP has trajectory.

16. The closed three-site quantum particle system according to claim 15, wherein the difference between the energy of the probe state and the energy of the qubit, and the tunnelling rate between the probe state and the reference spin are modulated to effect AFP.

17. The closed three-site quantum particle system according to claim 16, wherein the AFP trajectory is reversed to re-initialise the qubit into a known state.

18. The closed three-site quantum particle system according to claim 13 wherein the energies and tunnelling rates are controlled using gate electrodes.

19. The closed three-site quantum particle system according to claim 18, wherein voltages on the gate electrodes are controlled.

20. The closed three-site quantum particle system according to claim 19, wherein a sensitive electrometer is used for reading out the population in third state.

21. The closed three-site quantum particle system according to claim 20, wherein the sensitive electrometer is realised by a single electron transistor (SET) which monitors charge in the third, weakly coupled, site.

22. The closed three-site quantum particle system according to claim 21, wherein the sensitive electrometer is realised by a quantum point contact.

23. The closed three-site quantum particle system according to claim 13, applied to readout from a quantum computer.

24. The closed three-site Quantum particle system according to claim 23, wherein the quantum computer uses nuclear spin or electron spin qubits.

25. The closed three-site quantum particle system according to claim 1, wherein the system is used with flux quanta or 2D electron gas, and a third state introduced for readout.

* * * * *